United States Patent [19]

Ritter et al.

[11] Patent Number: 5,134,269
[45] Date of Patent: Jul. 28, 1992

[54] GRID WELDING MACHINE OPERATING ACCORDING TO THE ELECTRICAL RESISTANCE WELDING PRINCIPLE

[75] Inventors: Gerhard Ritter; Klaus Ritter; Rudolf Scherr; Kurt Jursche, all of Graz, Austria

[73] Assignee: EVG Entwicklungs—u. Verwertungs-Gesellschaft m.b.H., Graz, Austria

[21] Appl. No.: 490,573

[22] PCT Filed: Jun. 6, 1989

[86] PCT No.: PCT/AT89/00055
§ 371 Date: Feb. 5, 1990
§ 102(e) Date: Feb. 5, 1990

[87] PCT Pub. No.: WO89/11933
PCT Pub. Date: Dec. 14, 1989

[30] Foreign Application Priority Data

Jun. 8, 1988 [AT] Austria ................... 1491/88

[51] Int. Cl.$^5$ ............................................. B23K 11/00
[52] U.S. Cl. .................................................. 219/78.01
[58] Field of Search ........................ 219/56, 58, 78.01

[56] References Cited

U.S. PATENT DOCUMENTS

| | | |
|---|---|---|
| 3,162,744 | 12/1964 | Stern et al. |
| 3,206,586 | 9/1965 | Crane et al. |
| 3,731,042 | 5/1973 | Ritter et al. ............ 219/56 |
| 4,609,802 | 9/1986 | Sotonyi et al. ........... 219/56 |
| 4,673,786 | 6/1987 | Gott et al. .............. 219/56 |
| 4,853,511 | 8/1989 | Ritter et al. ............ 219/56 |

FOREIGN PATENT DOCUMENTS

| | | |
|---|---|---|
| 215268 | 5/1961 | Austria . |
| 235663 | 9/1964 | Austria . |
| 292427 | 8/1971 | Austria . |
| 308501 | 7/1973 | Austria . |
| 2622167 | 12/1977 | Fed. Rep. of Germany . |
| 7336093 | 5/1975 | France . |
| 7715282 | 12/1977 | France . |
| 372303 | 6/1932 | United Kingdom . |

Primary Examiner—Geoffrey S. Evans
Attorney, Agent, or Firm—Frishauf, Holtz, Goodman & Woodward

[57] ABSTRACT

In a grid welding machine with a horizontal longitudinal wire guide path (4) and transverse wire feeders (27, 28) arranged above and below the latter and transverse rows of active welding electrodes (7, 8), the two rows of electrodes (7, 8) are moved up or down away from the longitudinal wire path (B—B) in synchronization with the welding cycle before transverse wires (Q1, Q2) are placed simultaneously on each side of the longitudinal wire assemblage (L). The transverse wires (Q1, Q2) are then brought into the welding position between the two rows of electrodes (7, 8) and the electrodes are applied to these transverse wires (Q1, Q2). Finally, a row of electrodes (7) are stopped as an abutment against which the welding pressure is applied through the other row of electrodes (8) so that a welding current flows between each electrode pair (7, 8) in series over the point of intersection of each longitudinal wire (L) with two contacting transverse wires (Q1, Q2).

12 Claims, 1 Drawing Sheet

GRID WELDING MACHINE OPERATING ACCORDING TO THE ELECTRICAL RESISTANCE WELDING PRINCIPLE

FIELD OF THE INVENTION

The invention relates to a grid welding machine operating on the electrical resistance principle with a horizontal feed path for a parallel longitudinal wire bunch and transverse wire feeders disposed above and below the same, which bring transverse wires, which are to be attached by welding, into the welding positions perpendicularly to the longitudinal wires between the longitudinal wire bunch and the rows of active welding electrodes disposed on both sides thereof.

BACKGROUND

Grid welding machines of this type are already known for various uses, for example in order to be able to attach, by welding, transverse wires of the desired length of sections, corresponding to wire mats of a group assembly or bunch of longitudinal wires. The transverse wires are fed alternately on the top and the underside of the longitudinal wire bunch, so that it becomes possible to stack, in a space-saving manner, the grid mats cut into sections, without turning them by 90°, by engagement of the transverse wires of one mat into the spaces between the transverse wires of the neighboring mat (see, for example, Austrian Patent AT-PS 215.268). In another manner of application, the transverse wires brought in above and below the longitudinal wire bunch are selectively welded together with associated wires of a longitudinal wire bunch in such a way, that two grid bodies are created simultaneously, the longitudinal wires of the one grid body lying in the spaces between the longitudinal wires of the other grid body (see German Patent Disclosure Document DE-OS 26 22 167).

It is an present invention to design a grid welding machine of the species recited above in such a way that it allows, in a simple and operational safe way, the production of welded grids in which two transverse wires group or are located opposite each other in a longitudinal wire bunch in order to stiffen the grid in this way and when the grid is used for reinforcement of concrete, to improve the anchoring of the reinforcement grid in the concrete.

Briefly, in accordance with the invention, during an operating cycle, first two rows of electrodes are movable, up- or downwardly, respectively, away from the longitudinal wire path in order to allow the simultaneous supply of wires of the wire bunch. Two transverse wires are then simultaneously transported into the weld positions between the two rows of electrodes. The transverse wires are placed against the longitudinal wires of the wire bunch, located between the transverse wires. One row of electrodes can be immobilized and backed up, so that the electrodes of the one row form abutment, or counter, or back-up supports, while welding pressure can be applied to the electrodes of the other row, so welding pressure can be applied to the other row of electrodes, so that each longitudinal wire is simultaneously welded together with the two abutting transverse wires by means of the welding current flowing between each pair of electrodes in series via the intersecting point between one longitudinal wire and two abutting transverse wires.

In a preferred embodiment of the invention, wherein the electrodes of the two rows have been mechanically combined in pairs into a unit by means of a connecting piece extending through the longitudinal wire path, flexible copper braids are inserted in the power supplies of the two electrodes.

In accordance with a feature of the invention the electrodes of the one row are attached to a common electrode bar which can, during the work cycle, be mechanically displaced in relation to the longitudinal wire path, for example by an eccentric or a cam drive, into a rigid abutment position; hydraulic cylinders are assigned to the electrodes of the other row, which can also displaced in relation to the longitudinal wire path and charged with welding pressure.

In accordance with another feature of the invention, the transverse wire feeder for the upper transverse wires brings each transverse wire into the weld position by means of gravity, while the transverse wire feeder for the lower transverse wires has fork-like feed elements which, by means of the fork, each take up a lower transverse wire and lift it into the weld position along a prescribed feed path.

Further characteristics of the invention ensue from the following description of an exemplary embodiment by means of the drawings.

DRAWINGS

FIG. 1 is a lateral view of a welding machine according to the invention, by means of which grid mats can be made, preferably from longitudinal and transverse wires which have previously been cut into sections; and FIG. 2 is a side view of a resulting mat portion.

DETAILED DESCRIPTION

Figures 1, 2:
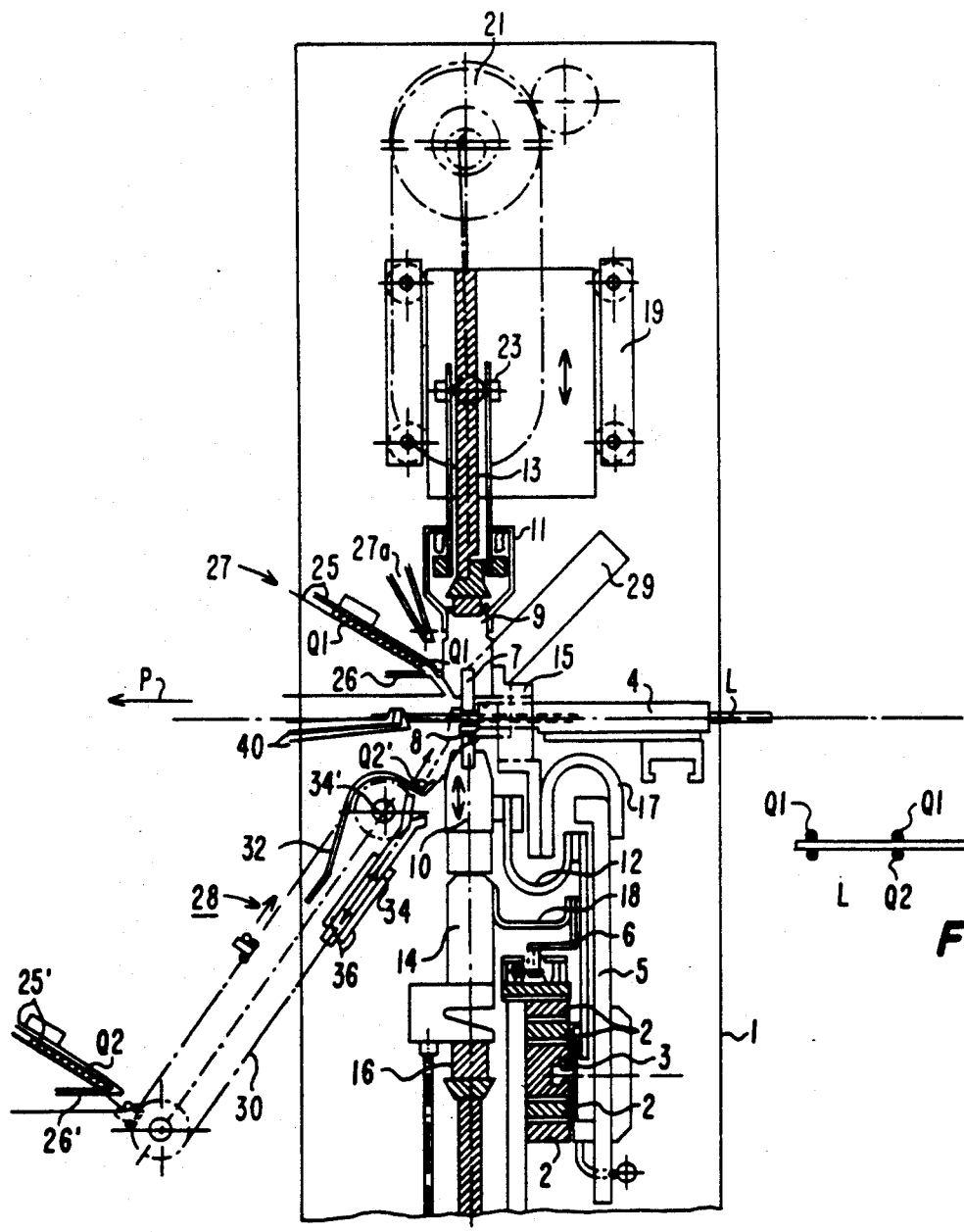

The welding machine in accordance with the invention shown has generally the following structure:

Four conductor rails 2, disposed crosswise to the feed direction P of the longitudinal wires, are supported on a transverse bar 3 of the machine body 1, only schematically indicated, and are insulated against each other and the machine body. The conductor rails 2 are connected with at least one, preferably with a plurality of welding transformers, not shown. Pairs of collectors 5, 6 are slidably disposed along the conductor rails 2 and make contact with each one of the conductor rails 2 and are connected with electrodes 7, 8 disposed on both sides of the longitudinal wire path B—B in transverse rows.

The electrodes 7 located above the welding plane are seated in electrode supports 9 which are fixed on an electrode bar 13 by means of clamping elements 11. Each electrode support 9 is connected by means of a rigid connecting piece 15 extending through the longitudinal wire path B—B with a flexible wire braid 17, which is fixed on the associated collector 5.

The electrodes 8 located below the longitudinal wire path are seated in electrode supports 10, on each of which a flexible wire braid 12 of the associated conductor 6 is fastened. Each electrode support 10 is acted upon on its lower end by a vertical hydraulic cylinder 14 which is downwardly, fixedly supported on a fixed slide rail 16.

The hydraulic cylinders 14 are connected with hydraulic valves, not shown, which control these cylinders in accordance with the work cycle of the welding machine. In the retracted position of each hydraulic cylinder 14, the associated electrode support 10 is lowered accordingly in order to allow the feeding of a lower transverse wire Q2. During extension, the welding pressure is set in accordance with the diameters of the wires to be welded by means of the control of the hydraulic cylinders 14.

The upper electrode bar 13 is guided in a vertical roller guide 19 and, by means of an eccentric drive 21, is cause to perform stroke movements corresponding to the work cycle of the welding machine in order to raise each of the upper electrode supports 9 and the associated welding electrodes 7 in such a way, that in the topmost position of the electrodes 7 it is possible to guide an upper transverse wire Q1 into the welding line without hindrance. In the lowest position of the electrode bar 13 and of the electrodes 7, the position of the longitudinal wires L and the transverse wires Q1, Q2 is exactly defined for welding to each other. Then the upper electrodes 7 act as backup or counter supports, or abutments and take up the welding pressure supplied by the lower electrodes 8 to the intersecting points of each one of the longitudinal wires L with two transverse wires Q1, Q2.

For initial adjustment of the upper electrode supports 9, the upper electrode bar 13 can be adjusted in height by means of an eccentric adjustment means 23. Simultaneously with the raising of the upper electrodes 7, the lower electrodes 6 are lowered by a set degree by means of the hydraulic cylinders 14 in order to achieve a sufficient opening of the electrode gap.

The longitudinal wires L, preferably cut in sections in accordance with the desired length of the grid mats to be produced, are fed in between the two rows of electrodes 7, 8 via parallel longitudinal wire guides 4, which define the horizontal longitudinal wire path B—B.

Feeding of the upper and lower transverse wires Q1 and Q2 takes place from supply magazines which mainly are comprised of parallel guide plates 25, 25'. The supply magazines are each intermittently closed or opened by a magazine stop 26, 26', so that only one transverse wire each can leave the magazine. The guide plates 25, 25' form a feed gap for the respective transverse wires Q1, Q2. In the case of the upper transverse wire feeder 27, this feed gap is directed directly onto the weld line and the end of the transverse feed paths is defined by the longitudinal wires L and by transverse wire stops 29, so that each upper transverse wire Q1, following the pull of gravity, moves up to the weld line, i.e. up to the transverse wire stops 29 when being fed in.

In the case of the lower transverse wire feeder 28, the feed gap formed by the guide plates 25, 25' is directed towards powered transport chains 30, which pick up the transverse wires Q2 from the supply magazine and transport them into a take-over position Q2' via guide plates 32. In this position Q2', the lower transverse wires Q2 are taken up by further feed elements 34, are brought into the welding line and pressed against the transverse wire stops 29 there. Each feed elements 34 can be displaced in the direction towards or away from the weld line in a guide 36 by means of drive elements, not shown. The front end of the feed elements 34 is fork-shaped, so that each lower transverse wire Q2 is securely maintained during the feed motion. Furthermore, the tine 34' of each driven fork 34 facing away from the weld line has been lengthened and its inner surface extends in the end position, shown by dashed lines in FIG. 1, approximately parallel to the transverse wire stops 29, so that towards the end of the feed movement of a lower transverse wire Q2 each feed element 34 also can, in case gravity is not sufficient for feeding in the associated upper transverse wire Q1, push the latter into the weld line and, if necessary, press it against the transverse wire stops 29.

During the welding stroke of the lower electrodes 8, the hydraulic cylinders 14 raise the lower transverse wire Q2 from the fork of each feed element 34 into the exact weld position on the longitudinal wires L. After completion of the welding step, the feed elements 34 return into their starting position, clear the path of advance of the grid and it is possible to advance the grid in a known manner by means of drawing hooks 40 by one transverse wire division. In an also known manner any desired transverse wire division of the grid mats can be set by means of a suitable control of the drawing hooks 40.

A change in the longitudinal wire division of the grid mats takes place by corresponding displacement of the upper and lower electrode supports 9, 10 with the associated connecting piece 15, the wire braids 12, 17, the collectors 5, 6 and the hydraulic cylinders 14, along with a simultaneous displacement of the longitudinal wire guides 4 and, if required, also of the transverse wire stops 29 and the feed elements 34, parallel to the longitudinal wire path B—B and vertically to the longitudinal wire feed direction P.

As indicated in FIG. 1, it is also possible to use a plurality of upper transverse wire feeders 27 and 27a, for example so as to allow feeding of transverse wires Q1 having different diameters and different length. Analogously, a plurality of feeds may be provided for the lower transverse wires Q2.

It is furthermore possible within the scope of the invention to supply transverse wires Q1, Q2, cut into sections in a known manner by two injection drives, not shown, placed at the sides of the welding machine, for example, to the take-over position Q2' for the lower transverse wire Q2, as well as, for example, to the take-off position Q1' of the upper transverse wire feeds 27, 27a, and to transport them by means of the feed elements 34 into the weld line, press them against the transverse wire stops 29 and then to perform welding with the longitudinal wires L. Lateral feed of the transverse wires Q1, Q2 above and below the longitudinal wire path B—B directly into the weld line by means of injection drives is also possible within the scope of the invention. In all cases the injection drives may be disposed only on one side or on both sides of the welding machine above and/or below the longitudinal wire path B—B. A disposition on both sides, either only above or only below the longitudinal wire path B—B is made possible, for example, in a known manner by means of transverse wire or cross-wire switches.

The exemplary embodiment shown allows different variants within the scope of the invention. For example, in accordance with another modification if is possible to provide pneumatic transverse wire feeders and magnetically operating transverse wire stops. It is furthermore possible to temporarily idle one of the transverse wire feeders in order to produce normal grids with single transverse wires. Additionally, by controlled temporary idling of the upper or lower transverse wire feed it is possible to produce grids which alternately have double transverse wires and single upper or lower transverse wires. The longitudinal wires can be precut into sections or continuously supplied from a coil.

We claim:

1. Grid welding machine operating on the electrical resistance principle defining a horizontal feed path (B—B) for a group or bunch of parallel longitudinal wires (L) having transverse wire feeders located, respectively, above and below said horizontal feed path to bring two transverse wires (Q1, Q2) perpendicularly to the longitudinal wires above and below, respectively, the longitudinal wires of the group, into a cross weld position, to permit each longitudinal wire of the group to be simultaneously welded together with two crossing transverse wires by means of welding current; and two rows of electrodes (7, 8) located above and below, respectively, said feed path (B—B) for applying said welding current at said weld positions, said machine comprising, in accordance with the invention, means (14, 19, 21) for moving said two rows of electrodes, during a welding cycle, first upwardly and downwardly, respectively, away from the longitudinal wire path (B—B) in order to allow said transverse wire feeders to simultaneously feed the transverse wires (Q1, Q2) into the weld positions between the two rows of electrodes (7, 8) on both sides of the longitudinal wires (L) of the group or bunch, and then move said two rows of electrodes, respectively, downwardly and upwardly into welding positions; and wherein the moving means (19, 21) for one (7) row of electrodes braces said electrodes in a back-up or counter or support or abutment position, so that the electrodes will be immobilized; and the other moving means (14) for moving the other (8) row of electrodes applies welding pressure at said welding positions so that, at said welding positions, a respective longitudinal wire (L) of the group or bunch is simultaneously welded to two engaging transverse wires (Q1, Q2) by said welding current.

2. The machine of claim 1, wherein said means (19, 21) for moving said one row of electrodes (7) comprises a cam drive (21), and a common electrode bar (13) driven by said cam drive, for mechanical displacement of said one row of electrodes (7) in relation to the longitudinal wire path and for providing, at a predetermined cam position, a stop or abutment or support or back-up position; and wherein said moving means (14) for the other row of electrodes (8) comprises a fluid cylinder (14), subjected to welding pressure when welding is to be effected.

3. The machine of claim 2, wherein said cam drive is an eccentric drive (21).

4. The machine of claim 2, wherein said fluid pressure cylinder is a hydraulic cylinder (14).

5. The machine of claim 2, wherein said transverse feeders comprise an upper transverse wire feeder (27) for the upper transverse wires (Q1) to supply each transverse wire into the weld position by means of gravity; and a lower transverse wire feeder (28) for the lower transverse wires (Q2), said lower transverse wire feeder having fork-like feed elements (34) which, by means of the fork-like feed elements, each take up a lower transverse wire (Q2) and lift it into the welding position along a predetermined feed path.

6. The machine of claim 2, further including a slide rail (16) supporting said moving means (14) for moving said other row (8) of electrodes; and conductor rails (2) are provided slidably coupled to said pairs of electrodes (7, 8) to permit transverse movement of said electrodes, including power supply therefor, as well as of said moving means (14) for the other electrodes (8).

7. The machine of claim 6, wherein said moving means (14) for said other electrodes (8) comprises a fluid cylinder, movable along said rail.

8. The machine of claim 7, wherein said transverse feeders comprise an upper transverse wire feeder (27) for the upper transverse wires (Q1) to supply each transverse wire into the weld position by means of gravity; and a lower transverse wire feeder (28) for the lower transverse wires (Q2), said lower transverse wire feeder having fork-like feed elements (34) which, by means of the fork-like feed elements, each take up a lower transverse wire (Q2) and lift it into the welding position along a predetermined feed path.

9. The machine of claim 1, further including a slide rail (16) supporting said moving means (14) for moving said other row (8) of electrodes; and conductor rails (2) are provided slidably coupled to said pairs of electrodes (7, 8) to permit transverse movement of said electrodes, including power supply therefor, as well as of said moving means (14) for the other electrodes (8).

10. The machine of claim 9, wherein said moving means (14) for said other electrodes (8) comprises a fluid cylinder, movable along said rail.

11. The machine of claim 1, wherein said transverse feeders comprise an upper transverse wire feeder (27) for the upper transverse wires (Q1) to supply each transverse wire into the weld position by means of gravity; and a lower transverse wire feeder (28) for the lower transverse wires (Q2), said lower transverse wire feeder having fork-like elements (34) which, by means of the fork-like feed elements, each take up a lower transverse wire (Q2) and lift it into the welding position along a predetermined feed path.

12. The machine of claim 11, further including transverse wire positioning stop means (29) for positioning said transverse wires at the welding position; and wherein said fork-like feed elements (34) include a projecting tine (34') facing away from the weld position, said projecting tine being located such that in its terminal position, it simultaneously presses a transported lower transverse wire (Q2) as well as an upper transverse wire (Q1) against the transverse wire stop means (29) when said transverse wires are at said weld position.

* * * * *